J. C. KERSTETER.
MOTOR.
APPLICATION FILED JUNE 13, 1914.

1,162,372.

Patented Nov. 30, 1915.
2 SHEETS—SHEET 1.

WITNESSES
M. R. McInnis
G. E. Sorensen.

INVENTOR
JOEL C. KERSTETER
BY Paul & Paul
ATTORNEYS

J. C. KERSTETER.
MOTOR.
APPLICATION FILED JUNE 13, 1914.

1,162,372.

Patented Nov. 30, 1915.
2 SHEETS—SHEET 2.

WITNESSES
M. R. McLewis
G. E. Sorensen

INVENTOR
JOEL C. KERSTETER
BY
Paul Paul
ATTORNEYS

UNITED STATES PATENT OFFICE.

JOEL C. KERSTETER, OF MINNEAPOLIS, MINNESOTA, ASSIGNOR TO MINNEAPOLIS HEAT REGULATOR CO., OF MINNEAPOLIS, MINNESOTA, A CORPORATION.

MOTOR.

1,162,372.   Specification of Letters Patent.   Patented Nov. 30, 1915.

Application filed June 13, 1914. Serial No. 844,932.

*To all whom it may concern:*

Be it known that I, JOEL C. KERSTETER, citizen of the United States, resident of Minneapolis, county of Hennepin, State of Minnesota, have invented certain new and useful Improvements in Motors, of which the following is a specification.

My invention relates to a springless motor designed for use in connection with a thermostat for shifting the dampers of a heating plant.

The object of the invention is to provide a motor of comparatively simple construction and accurate and reliable in operation. A further object is to provide a motor which will respond quickly when the circuit is closed at the thermostat and can be operated with a comparatively small battery.

Other objects of the invention will appear from the following detailed description.

The invention consists generally in various constructions and combinations, all as hereinafter described and particularly pointed out in the claims.

Figure 1:
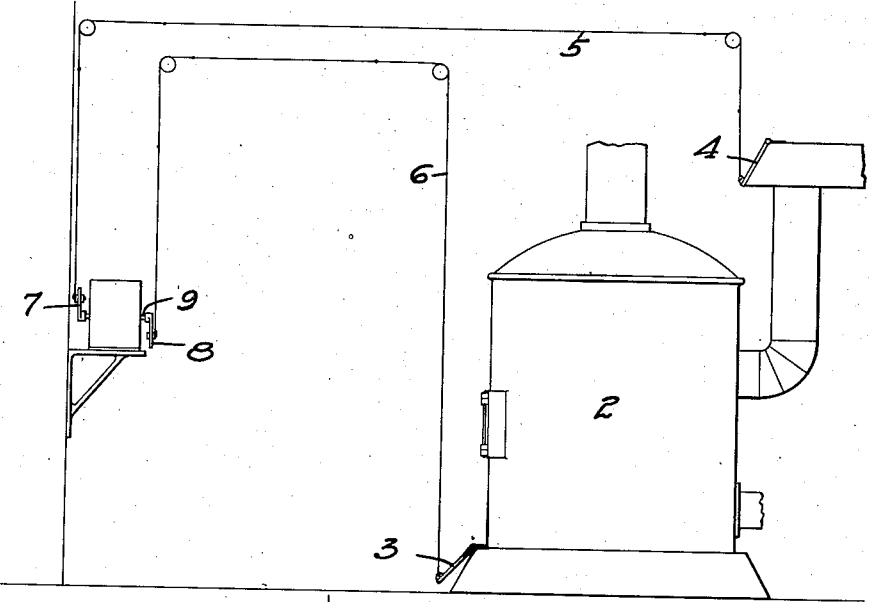
Figures 6, 7:
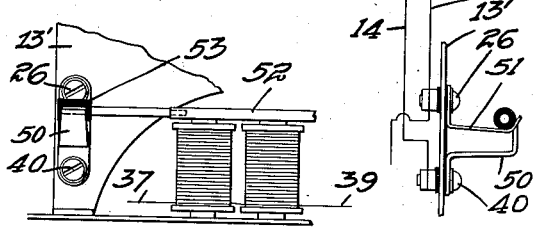
Figure 2:
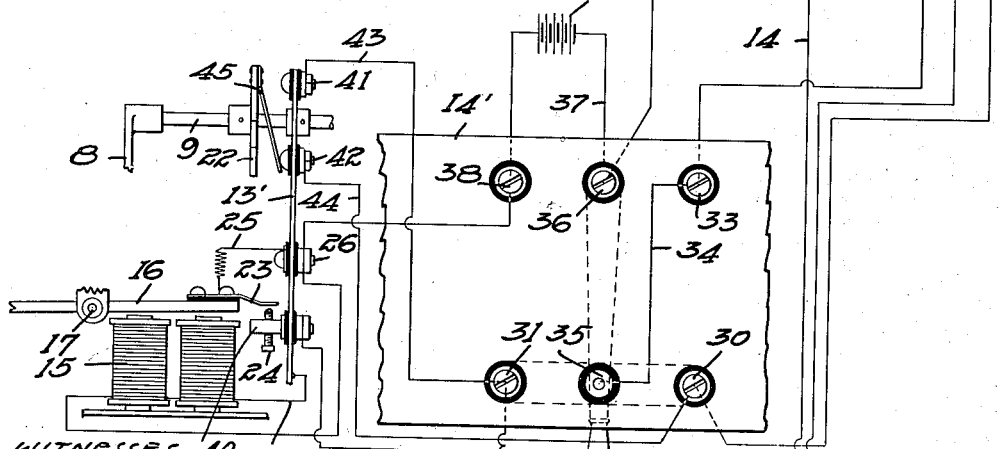
Figure 3:
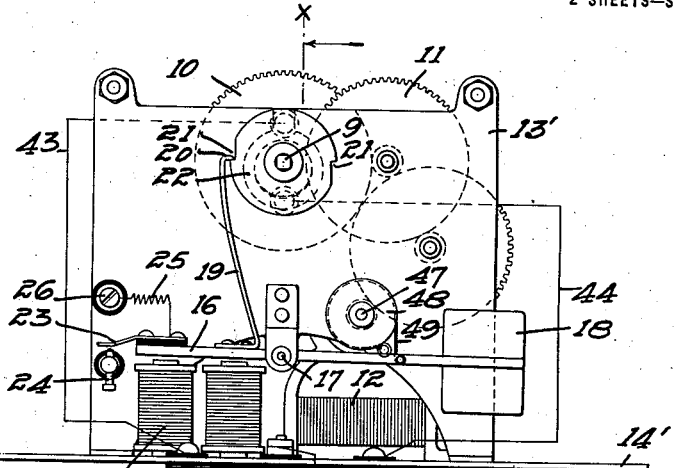
Figure 4:
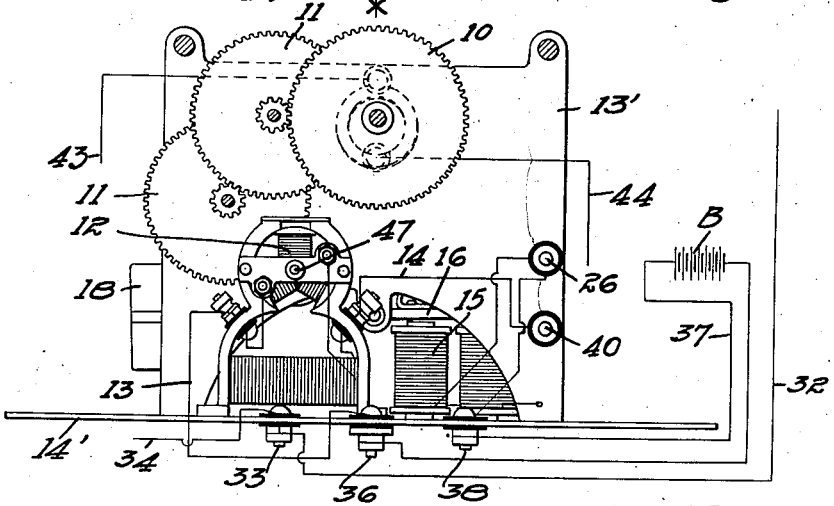
Figure 5:
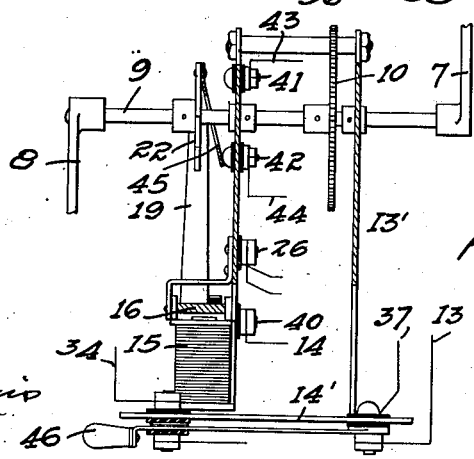

In the accompanying drawings forming part of this specification, Figure 1 is a view of a heating plant with my invention applied thereto, Fig. 2 is a diagrammatic view, illustrating the electric connections between the thermostat and the motor and also showing the form of circuit closer used in the motor, Fig. 3 is an elevation of one side of the machine, Fig. 4 is a similar view, of the opposite side of the machine, Fig. 5 is a vertical sectional view, on the line x—x of Fig. 3, Fig. 6 is a detail view of a modified construction of the armature and contact point, Fig. 7 is an edge view of Fig. 6.

In the drawing, 2 represents a heating plant having a direct draft damper 3 and check damper 4. These dampers have connections 5 and 6 with cranks 7 and 8 secured on the motor shaft 9. On this shaft a gear 10 is mounted, connected through a train of gears 11 with a small electric motor 12 connected through conductors 13 and 14 with suitable source of electrical energy, such as a battery "B". This motor, when operated, is adapted to revolve the gears and the shaft 9 and turn the cranks 7 and 8 a half revolution. A frame 13' is mounted on a suitable base 14' and has bearings for the shaft 9, while the motor 12 is secured on said base. A pair of electro-magnets 15 are mounted on said base and have an armature 16 pivoted at 17 and provided at one end with a weight 18. An arm 19 is mounted on said armature and has a hook 20 adapted to enter a recess 21 in the disk 22 that is secured to the shaft 9. There are two recesses in the peripheral edge of this disk, adapted to receive the hook 20 and thereby temporarily lock the shaft 9 and the gearing connected therewith. The armature 16 has a contact spring 23 adapted to engage a contact screw 24 and a conductor 25 connects the insulated binding screw 26 with the contact spring 23, said spring being insulated from the armature 16.

The armature is in circuit with a thermostat 27 through conductors 28 and 29 connected to the opposite contact points of the thermostat and leading to binding posts 30 and 31, on the base of the motor. A third conductor 32 leads from a binding post on the thermostat to a post 33 on said base and a conductor 34 leads from the post 33 to a switch post 35, preferably arranged on said base intermediate the posts 30 and 31. A post 36 has a conductor 37 leading to the battery "B", and through this battery to a post 38 and from thence to the post 26 and one side of the electro-magnets. The other side of the electro-magnets has a conductor 39 leading to the machine frame. A post 40, in which the contact screw 24 is mounted, forms the terminal for the conductor 14 for closing the circuit when the spring 23 engages the screw 24 upon the tilting of the armature. The circuit closing posts 41 and 42 are connected by conductors 43 and 44 with the posts 31 and 30, and a circuit closing device 45 is mounted on the shaft 9 and arranged to break the circuit through the conductors connected with one side of the thermostat and close the circuit through the conductors connected to the opposite side of the thermostat, so that when the thermostat changes, the mechanism will be released to shift the dampers.

When the thermostat blade contacts with one of the points either on the hot or cold side of the thermostat, the magnets will be energized, the circuit being closed through them from the thermostat and through the conductor 39 and the frame of the machine, the shaft 9 and the circuit closer, and the battery back to the armature. The energizing of the magnets will attract the armature 16, raising the weight 18 and moving the spring 23 into contact with the point 24 and closing the electric motor circuit to operate the crank shaft 9 and shift the dampers. The revolution of the electric motor will continue until the hook 20 drops into the recess 21 of the disk 22, whereupon the circuit having been broken through the magnets, the armature will tilt under the influence of the weight 18, move the spring 23 out of contact with the point 24, and break the circuit through the motor. The shaft 47 of the electric motor 12 has a disk 48 thereon provided with a friction strap 49 connected to the armature 16, and when the circuit is broken through the electric motor by the tilting of the armature, the strap 49 will be tightened or the disk 48 and revolution of the electric motor will be checked. As soon as the magnets are again energized by the closing of the circuit through the thermostat, the armature 16 will be attracted and the brake strap loosened to allow the electric motor to be again started to revolve the crank shaft a half revolution and change the dampers. The switch device 46 enables the attendant to change the dampers while in the basement to close the check and open the draft to carry off the gas from fresh fuel, without the necessity of changing the adjustment of the thermostat.

In Figs. 6 and 7 I have shown a modification, which consists in eliminating the spring 25 between the contact spring 23 and the post 26 and providing a contact spring 50 connected with the post 40, while a circuit closing spring 51 is connected with the post 26. This spring 51 is adapted to yield to engage the spring 50, and the armature 52 has an insulating roll 53 thereon adapted to contact with the spring 51 and press it down into engagement with the spring 50 and thereby close the circuit between them. As soon as the pressure of the roll 53 is released from the spring 51, it will return to its normal position, breaking the circuit.

This motor is of comparatively simple construction, is positive and reliable in its operation, and the electric motor will operate with comparatively small battery power and will develop sufficient lifting power to change comparatively heavy dampers on the heating plant.

The details of construction may be modified in various ways and still be within the scope of my invention.

I claim as my invention:

1. The combination, with a thermostat, of electro-magnets in circuit therewith, a lever pivoted at a point intermediate its ends and provided with an armature and a contact spring at one end, and a weight at the other end, an electric motor normally locked by said armature against revolution and having a circuit closed by said armature when it is tilted by the energizing of said magnets, a crank shaft geared to said electric motor, a circuit breaker for said circuit, a disk geared to and driven by said electric motor, and a brake strap surrounding said disk and having its ends connected to said lever between its supporting pivot and the weight arranged thereon, substantially as described.

2. A device of the class described comprising, in combination, a thermostatic circuit having electro-magnets, a lever pivoted at a point intermediate its ends and having an armature and a contact spring at one side of the pivot and a weight at the other side, an electric motor circuit having a contact point in the path of said spring for closing said circuit when the magnets are energized to attract said armature, an electric motor in said motor circuit, a crank-shaft geared to said electric motor, a notched disk secured upon said crank shaft, an arm carried by the armature lever and engaging said disk and preventing the tilting of said armature except when the end of said arm is in engagement with one of the notches in said disk, a crank geared to said electric motor, a circuit breaker for said circuits, a disk geared to said electric motor and a brake strap surrounding said disk and connected to said armature lever between its point of pivotal support and the weight carried by said lever, substantially as described.

In witness whereof, I have hereunto set my hand this 3rd day of June 1914.

JOEL C. KERSTETER.

Witnesses:
EDWARD A. PAUL,
GENEVIEVE E. SORENSEN.